(12) United States Patent
Chowdhury et al.

(10) Patent No.: US 11,549,606 B2
(45) Date of Patent: Jan. 10, 2023

(54) PILOT-PRESSURE-CONTROLLED FLOW VALVE AND FLUID SYSTEM CONTAINING SAME

(71) Applicant: MAHLE International GmbH, Stuttgart (DE)

(72) Inventors: Sourav Chowdhury, East Amherst, NY (US); Daniel Rupp, Lockport, NY (US); Mark J. Zima, Clarence Center, NY (US); Brian Cripps, Littleton, CO (US); Kevin Curtin, Littleton, CO (US)

(73) Assignee: MAHLE International GmbH, Stuttgart (DE)

( * ) Notice: Subject to any disclaimer, the term of this patent is extended or adjusted under 35 U.S.C. 154(b) by 106 days.

(21) Appl. No.: 16/202,735

(22) Filed: Nov. 28, 2018

(65) Prior Publication Data
US 2020/0166149 A1 May 28, 2020

(51) Int. Cl.
*F16K 17/06* (2006.01)
(52) U.S. Cl.
CPC .................. *F16K 17/065* (2013.01)
(58) Field of Classification Search
CPC ........................ F16K 17/065; B60H 1/00342
USPC .............................. 137/565.14, 511
See application file for complete search history.

(56) References Cited

U.S. PATENT DOCUMENTS

| | | | | |
|---|---|---|---|---|
| 2,384,420 A * | 9/1945 | Griswold | ................ | F04D 15/02 417/316 |
| 3,003,331 A * | 10/1961 | Coburn | ................... | F25B 49/02 62/161 |
| 3,738,117 A * | 6/1973 | Engel | ...................... | F24F 3/153 62/173 |
| 3,779,031 A * | 12/1973 | Akiyama | ................ | F24F 3/153 62/160 |
| 3,791,619 A * | 2/1974 | Pett | ....................... | F16K 31/402 251/45 |
| 3,798,920 A * | 3/1974 | Morgan | .................. | F24F 5/001 62/173 |

(Continued)

FOREIGN PATENT DOCUMENTS

| CN | 201037556 Y | 3/2008 |
|---|---|---|
| DE | 102011078228 A1 | 6/2012 |

OTHER PUBLICATIONS

Wikipedia, "Pilot-Operated Relief Valve," Nov. 22, 2018, 3 pages.
(Continued)

*Primary Examiner* — Daphne M Barry
(74) *Attorney, Agent, or Firm* — Dickinson Wright PLLC

(57) ABSTRACT

In a thermal fluid system, a control valve includes a flow valve and a solenoid pilot valve. The flow valve has an inlet and an outlet; a control chamber for receiving a pilot pressure; and a valve member operable by the pilot pressure to selectively open and close a fluid path from the inlet to the outlet. The pilot pressure acts in a closing direction of the flow valve. The pilot valve provides the pilot pressure to the control chamber and is a 3/2 way valve with a first port in fluid communication with the control chamber, a second port to be connected to a pressure source, and a third port. The pilot valve has a first position connecting the first port with the second port and a second position connecting the first port with the third port.

16 Claims, 4 Drawing Sheets

(56) References Cited

U.S. PATENT DOCUMENTS

| | | | | | |
|---|---|---|---|---|---|
| 3,994,318 | A | * | 11/1976 | Ishigaki | F16K 31/404 137/630.14 |
| 4,132,384 | A | * | 1/1979 | Berg | F02G 5/00 251/129.08 |
| 4,226,259 | A | * | 10/1980 | Szekely | F16K 31/365 137/269 |
| 4,483,151 | A | * | 11/1984 | Fujioka | F25D 11/022 165/43 |
| 4,854,130 | A | * | 8/1989 | Naruse | F25B 41/04 62/352 |
| 5,058,391 | A | * | 10/1991 | Periot | H05K 7/20881 62/243 |
| 5,070,707 | A | * | 12/1991 | Ni | F25B 47/022 62/234 |
| 5,177,972 | A | * | 1/1993 | Sillato | F25B 49/025 62/205 |
| 5,182,920 | A | * | 2/1993 | Matsuoka | F25B 41/062 62/206 |
| 5,183,074 | A | * | 2/1993 | Reese | F02M 37/0029 137/488 |
| 5,226,472 | A | * | 7/1993 | Benevelli | B60H 1/00814 165/263 |
| 5,355,689 | A | * | 10/1994 | Hara | B60H 1/00814 62/159 |
| 5,419,149 | A | * | 5/1995 | Hara | B60H 1/00007 62/160 |
| 5,435,343 | A | * | 7/1995 | Buezis | G05D 16/2095 137/489 |
| 5,473,907 | A | * | 12/1995 | Briggs | F24D 5/12 62/238.7 |
| 5,531,264 | A | * | 7/1996 | Eike | B60H 1/00014 165/42 |
| 5,598,887 | A | * | 2/1997 | Ikeda | B60H 1/00392 165/202 |
| 5,634,348 | A | * | 6/1997 | Ikeda | B60H 1/00735 62/160 |
| 5,743,102 | A | * | 4/1998 | Thomas | A47F 3/04 165/219 |
| 5,813,490 | A | * | 9/1998 | Takasaki | B60K 23/0808 180/250 |
| 6,035,658 | A | * | 3/2000 | Launois | B60H 1/00907 62/196.4 |
| 6,142,176 | A | * | 11/2000 | Sagawa | F16K 17/082 137/514 |
| 6,202,430 | B1 | * | 3/2001 | Karl | B60H 1/00914 62/159 |
| 6,354,319 | B1 | * | 3/2002 | Mooney | G05D 16/163 137/14 |
| 6,422,308 | B1 | * | 7/2002 | Okawara | B60H 1/00921 165/202 |
| 6,502,393 | B1 | * | 1/2003 | Stephenson | F16K 31/408 60/424 |
| 6,584,785 | B1 | * | 7/2003 | Karl | B60H 1/00314 62/117 |
| 6,748,753 | B2 | * | 6/2004 | Takano | B60H 1/00585 165/42 |
| 6,991,028 | B2 | * | 1/2006 | Comeaux | F24F 5/0017 165/219 |
| 7,028,501 | B2 | * | 4/2006 | Casar | B60H 1/00899 165/240 |
| 7,272,948 | B2 | * | 9/2007 | Taras | F24F 3/153 62/324.1 |
| 8,613,305 | B2 | * | 12/2013 | Yu | B60H 1/00492 165/47 |
| 9,109,840 | B2 | | 8/2015 | Kadle et al. | |
| 9,346,336 | B2 | * | 5/2016 | Graaf | B60H 1/00007 |
| 9,441,851 | B2 | * | 9/2016 | Motomura | F25B 47/006 |
| 9,534,818 | B2 | * | 1/2017 | Bois | F24D 5/12 |
| 9,562,712 | B2 | * | 2/2017 | Kasuya | B60H 1/039 |
| 9,791,179 | B2 | * | 10/2017 | Kim | F28D 7/1607 |
| 10,611,212 | B2 | * | 4/2020 | Kuroda | B60H 1/00914 |
| 2010/0224804 | A1 | | 9/2010 | Sneh | |
| 2011/0271703 | A1 | * | 11/2011 | Park | F25B 47/022 62/291 |
| 2012/0011869 | A1 | * | 1/2012 | Kondo | B60H 1/039 62/176.5 |
| 2012/0222846 | A1 | | 9/2012 | Kadle et al. | |
| 2013/0283838 | A1 | | 10/2013 | Kadle et al. | |
| 2013/0319029 | A1 | * | 12/2013 | Sekiya | B60H 1/00899 62/238.7 |
| 2014/0190189 | A1 | | 7/2014 | Kowsky et al. | |
| 2017/0037984 | A1 | * | 2/2017 | Frippiat | F16K 11/07 |
| 2017/0182867 | A1 | * | 6/2017 | Durrani | B60H 1/00921 |

OTHER PUBLICATIONS www.ato.com, "Direct Acting vs. Pilot Operated Solenoid Valve," Aug. 8, 2018, 7 pages.

\* cited by examiner

PILOT-PRESSURE-CONTROLLED FLOW VALVE AND FLUID SYSTEM CONTAINING SAME

GOVERNMENT LICENSE RIGHTS

This invention was made with government support under Grant No. DE-EE0006840 awarded by Department of Energy of the United States. The government has certain rights in the invention.

TECHNICAL FIELD

The present application relates to hydraulic valves controlled by a pilot pressure provided by a solenoid actuated pilot valve. The application further relates to a fluid system for heating or cooling of both heating and cooling of functional components in an automotive vehicle.

BACKGROUND

In many automotive fluid systems, for example thermal systems, electrically actuated valves are used to control pilot pressures or to directly control a fluid flow. While direct solenoid flow valves are simple in operation—requiring a continuous direct current in the solenoid to allow or block fluid passage—hydraulic flow valves controlled by a pilot pressure supplied by a solenoid-actuated pilot valve are sometimes used to replace direct flow valves as a measure to reduce power consumption and valve size. In these pilot-pressure-controlled flow valves, the solenoid actuating the pilot valve provides an indirect control of the flow valve operation. In indirectly controlled flow valves, the current required to actuate the solenoid is much lower and is used to open or close a pilot fluid line to a control chamber of the flow valve to use the inlet pressure to open or close the flow valve. The use of fluid pressure in assisting the flow valve operation allows for the use of significantly lower electrical power and also smaller solenoids. The indirectly controlled flow valves have significant energy benefits. In a fluidic system, however, the indirectly controlled flow valves requires for its proper intended operation, a continuous positive pressure differential of a certain value across it i.e. the inlet pressure to the valve must be higher than the outlet pressure by a minimum positive value. This minimum value is determined by the effective areas inside the flow valve and the spring constant of a spring acting on the movable valve member of the flow valve. If the fluid system experiences dynamic conditions in which the differential pressure at least temporarily falls below the minimum pressure required for keeping the flow valve closed, the indirectly controlled flow valves will not close completely or only intermittently and the flow valve may leak fluid between its inlet and outlet ports, thereby impacting the system function.

SUMMARY

According to a first aspect of the present invention, a fluid system comprises at least one thermal fluid circuit for conveying coolant through at least one closed-loop fluid path. A pump for circulating the coolant through the circuit. A consumer device forming a heat sink or a heat source is disposed in the closed loop fluid path such that the fluid circulated by the pump may travel through the consumer device. The fluid system further comprises a control valve including a flow valve and a pilot valve.

The flow valve is disposed in the fluid circuit between the pressure side of the pump and the consumer device. The flow valve has an inlet in fluid communication with the pressure side of the pump, an outlet in fluid communication with an inlet of the consumer device, and a control chamber for receiving a pilot pressure. The flow valve is operable to permit the coolant circulated by the pump to reach the consumer device or to block the coolant circulated by the pump from reaching the consumer device. The pilot valve is configured to be actuated by a solenoid for providing the pilot pressure to the control chamber.

The pilot pressure acts on the flow valve in a closing direction of the flow valve. The pilot valve has a first setting, in which pressurized coolant flows into the control chamber to move the flow valve to and keep the flow valve in a closed position, in which a fluid path from the inlet to the outlet of the flow valve is shut off as long as the pilot valve is in the first setting. The pilot valve further has a second setting, in which the pilot pressure is lower than the pressure of the pressurized coolant entering the control chamber in the first setting.

The pilot valve may be realized as a 3/2 way valve with a first port in fluid communication with the control chamber, a second port in fluid communication with a pressure source, and a third port in fluid communication with a low-pressure conduit.

For establishing the desired pilot pressures, the third port may be in fluid communication with the outlet of the flow valve, and the second port may be in fluid communication with the inlet of the flow valve.

In such a valve, the pilot valve may establish a fluid communication between the first port and the second port in the first setting, and may establish a fluid communication between the first port and the third port in the second setting.

The control valve may further include a check valve disposed immediately upstream of the second port to allow pressurized coolant to flow toward the pilot valve and to prevent the coolant from exiting the pilot valve via the second port.

The pilot valve may in the first setting when the solenoid is de-energized and in the second setting when the solenoid is energized, or vice versa.

The flow valve may have a valve member formed by a diaphragm separating the inlet and the outlet from the control chamber and a valve spring biasing the flow valve toward the closed position.

According to a further aspect of the present invention, a control valve for controlling a fluid flow through a fluid circuit comprises a flow valve and a pilot valve. The flow valve has an inlet and an outlet; a control chamber for receiving a pilot pressure; and a valve member operable by the pilot pressure to selectively open and close a fluid path from the inlet to the outlet, the pilot pressure acts on the flow valve in a closing direction of the flow valve.

The pilot valve is configured to be actuated by a solenoid for providing the pilot pressure to the control chamber. The pilot valve is a 3/2 way valve with a first port in fluid communication with the control chamber, a second port to be connected to a pressure source, and a third port. The pilot valve has a first position connecting the first port with the second port and a second position connecting the first port with the third port.

The valve member may be a diaphragm separating the control chamber from both the inlet and the outlet cooperating with a valve seat on a side of the diaphragm opposite from the control chamber. The valve seat may surround a central area in fluid connection with the outlet of the flow valve and surrounded by a ring area in fluid connection with the inlet of the flow valve.

The flow valve further may further comprise a valve spring biasing the diaphragm toward the valve seat.

The control valve may further comprise a check valve disposed immediately upstream of the second port to allow pressurized coolant to flow toward the pilot valve and to prevent the coolant from exiting the pilot valve via the second port.

Further details and benefits of the present invention will become apparent from the following description of the associated drawings. The drawings are provided herewith for purely illustrative purposes and are not intended to limit the scope of the present invention.

DETAILED DESCRIPTION

Figure 1:
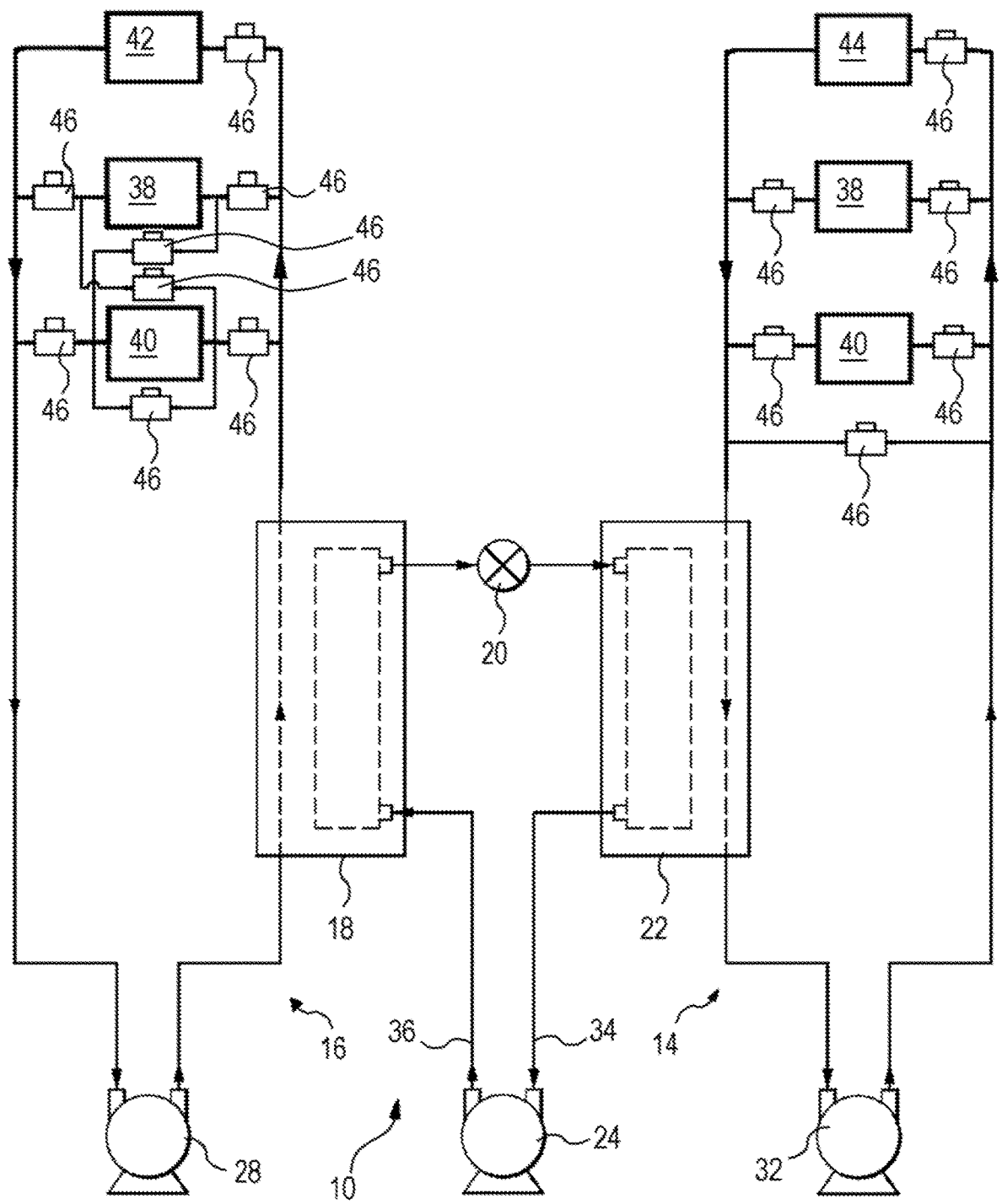
FIG. 1 shows a schematic flow diagram of a heat pump system as an example of a fluid system having a plurality of pilot-pressure-controlled flow valves according to an aspect of the present invention.

FIG. 1 is flow schematic of a fluid system 10 having a refrigerant loop 12 in thermal communication with a cold coolant loop 14 and a hot coolant loop 16. The main components of the refrigerant loop 12 include a condenser 18, a refrigerant expansion device 20 such a thermal expansion valve, and an evaporator 22 hydraulically connected in series. At the heart of the refrigerant loop is a refrigerant compressor 24 located downstream of the evaporator 22 and upstream of the condenser 18. The compressor 24 compresses and moves a two-phase refrigerant, such as R-134a or R-1234yf, around the refrigerant loop 12 of the fluid system 10.

The hot coolant loop 16 includes a condenser 18 and a hot side coolant pump 28 that circulates a hot side coolant through the condenser 18. Similarly, the cold coolant loop 14 includes an evaporator 22 and a cold side coolant pump 32 that circulates a cold side coolant through the evaporator 22. The heat exchange may be that of a water jacket encasing the condenser 18 and evaporator 22, respectively, or may be part of a plate-type heat exchanger, cross-flow or parallel-flow, or may have any other suitable heat exchanger configuration.

The cold coolant loop 14 selectively absorbs waste heat energy from various heat sources throughout the vehicle, such as the waste heat from the vehicle engine 38, which preferably is configured as a high-efficiency full-expansion engine (FEX); from the vehicle energy storage system (ESS) 40, generally a battery, and other electronics; and from a hot vehicle passenger compartment via an HVAC cooler 42. The heat sources 38, 40, and 42 are arranged in parallel within the cold coolant loop 14 so that each of the heat sources 38, 40, and 42 can be individually connected to the pressure side of the pump 32 to be cooled while others may be shut off from the cold coolant loop 14. The cold coolant loop 14 thus selectively cools the various heat sources 38, 40, and 42.

The refrigerant loop 12 transfers the heat energy from the cold coolant loop 14 to the hot coolant loop 16, which in turn selectively transfers the heat energy to various heat sinks throughout the vehicle, such as a cold passenger compartment, a cold vehicle engine, and the ESS 40, for example during a cold start. The fluid system 10 selectively captures superfluous heat energy and puts it to beneficial use within the vehicle where it is needed. Like the heat sources 38, 40, and 42, the heat sinks are also arranged in parallel to be selectively connectable to the pressure side of the pump 28 to provide selective individual heating of each heat sink without affecting the fluid connection through the other heat sinks.

A two phase refrigerant is circulated through the refrigerant loop 12 by the compressor 24, which includes a suction side 34 and a discharge side 36. The suction side of the compressor receives a low pressure vapor phase refrigerant from the evaporator 22, after absorbing heat from the cold side coolant, and compresses it to a high pressure vapor phase refrigerant, which is then discharged to the condenser 18. As the high pressure vapor phase refrigerant is condensed to a high pressure liquid phase refrigerant in the condenser 18, heat is transferred to the hot side coolant flowing through the condenser 18. Exiting the condenser 18, the high pressure liquid phase refrigerant may pass through a receiver (not shown) to separate any refrigerant vapor, a sub-cooler (not shown) to further cool the liquid phase refrigerant, and then to the thermal expansion valve 20, through which the refrigerant begins to expand into a bubbling liquid phase. The bubbling liquid phase refrigerant enters the evaporator 22, where it continues to expand into the low pressure vapor refrigerant, which is then cycled back to the suction side 34 of the compressor 24 to repeat the process.

In the circuit diagram of FIG. 1, each of the FEX 38 and the ESS 40 is shown as two separate elements, one in the cold coolant loop, and one in the hot coolant loop. Because the cold coolant loop and the hot coolant loop are filled with the same type of coolant, they typically utilize the same heat exchanger within the FEX 38 and the ESS 40. This means that the FEX 38 and ESS 40 in the hot coolant loop represent the same heat exchanger as the FEX 38 and the ESS 40, respectively, in the cold coolant loop. Thus, the inlet of the FEX 38 is shared between the hot coolant loop and the cold coolant loop and also the outlet of the FEX 38. Likewise, the inlet of the ESS 40 is shared between the hot coolant loop and the cold coolant loop and also the outlet of the ESS 40. In practice, heating and cooling of the same element, e.g. the ESS 40 or the FEX 38, are not required at the same time because the element is not simultaneously too hot and too cold. Various control valves 46 in the cold coolant loop and in the hot coolant loop are positioned to be actuated to selectively include the FEX 38 only either in the hot coolant loop or in the cold coolant loop. Likewise, the control valves 46 are configured to be actuated to include the ESS 40 only either in the hot coolant loop or in the cold coolant loop.

In contrast, an HVAC system for a passenger compartment operates a heater 44 and a cooler 42 at the same time. An evaporator operates as the cooler 42 to cool the entire air flow moved by an HVAC fan, and the heater 44 heats up a portion of the air flow that exits the evaporator. Accordingly, the HVAC heater 44 and HVAC cooler 42 are typically two separate heat exchangers and are not shared between the hot coolant loop and the cold coolant loop.

In the shown example, the fluid system 10 includes 14 control valves 46 that selectively control which elements are in fluid connection with the hot coolant loop or the cold coolant loop or to neither one of the hot coolant loop and the cold coolant loop. Arrows in FIG. 1 indicate the direction of coolant flow through the hot coolant loop and the cold coolant loop. In FIG. 1, the direction of coolant flow in both the hot coolant loop and the cold coolant loop occurs in a counter-clockwise direction. Each of the branch conduits associated with the heat sinks, i.e. the HVAC heater 44, the FEX 38, and the ESS 40 includes a control valve 46 upstream of the heat sink. The upstream control valves 46 are configured to be actuated to selectively block hot coolant from reaching the respective heat sink. The branch conduits associated with the FEX 38 and the ESS 40 also include a respective control valve 46 downstream of the heat sinks. This serves the purpose of keeping the hot coolant loop and the cold coolant loop separate despite jointly sharing the heat exchanger of the ESS 40 and the heat exchanger of the FEX 38, respectively. When the FEX 38 or the ESS 40 are in fluid communication with the hot coolant loop, the respective control valves 46 in the cold coolant loop are closed and vice versa.

As further shown, in FIG. 1, the individual branch conduits of the hot coolant loop may be interconnected via bridge connections from the outlet of the ESS 40 to the inlet of the FEX 38 or from the outlet of the FEX 38 to the inlet of the ESS 40. In one example, the control valves 46 at the inlet of the FEX 38, at the outlet of the ESS 40, and in the bridge connection from the outlet of the FEX 38 to the inlet of the ESS 40 may be closed, while the control valves 46 at the inlet of the ESS 40, at the outlet of the FEX 38 and in the bridge connection from the outlet of the ESS 40 to the inlet of the FEX 38 are open. This places the ESS 40 and the FEX 38 in series, with the ESS 40 being upstream of the FEX 38 in the hot coolant loop. Reverse settings of the control valves 46 places the FEX 38 and the ESS 40 in series, with the FEX 38 being upstream of the ESS 40 in the hot coolant loop. In the example shown, an ESS 40 bypass conduit with a control valve 46 is provided from the inlet of the ESS 40 to the outlet of the ESS 40.

In the cold coolant loop, each of the branch conduits associated with the heat sources, i.e. the HVAC cooler 42, the FEX 38, and the ESS 40 likewise includes a control valve 46 upstream of the heat sink. The upstream control valves 46 are configured to be actuated to selectively block cold coolant from reaching the respective heat source. The branch conduits associated with the FEX 38 and the ESS 40 also include a respective control valve 46 downstream of the heat sources 38, 40, and 42 to keep the hot coolant loop and the cold coolant loop separate despite jointly sharing the heat exchanger of the ESS 40 and the heat exchanger of the FEX 38, respectively. The cold coolant loop is set up to include a bypass branch conduit with a control valve 46 that can be opened when none of the heat sources 38, 40, and 42 is in fluid communication with the cold coolant loop. This allows the cold coolant to circulate even when all heat sources 38, 40, and 42 are disconnected.

It is desirable for a smoothly operating fluid system 10 that the control valves 46 attain a securely closed position when the associated branch line or bypass line is to be shut off form the respective hot coolant loop or cold coolant loop. According to the present disclosure, this is accomplished by control valves 46 that are composed of a hydraulically actuated flow valve 52 and a solenoid-actuated pilot valve 54 or 56 supplying a pilot pressure for the hydraulic control of the flow valve 52.

Figure 2:
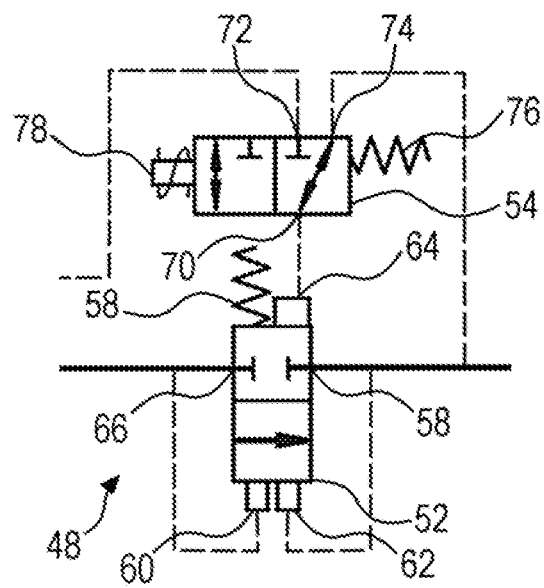
FIG. 2 shows a symbolic diagram of a first example of a pilot-pressure-controlled flow valve suited for use in the system of FIG. 1.
Figure 3:
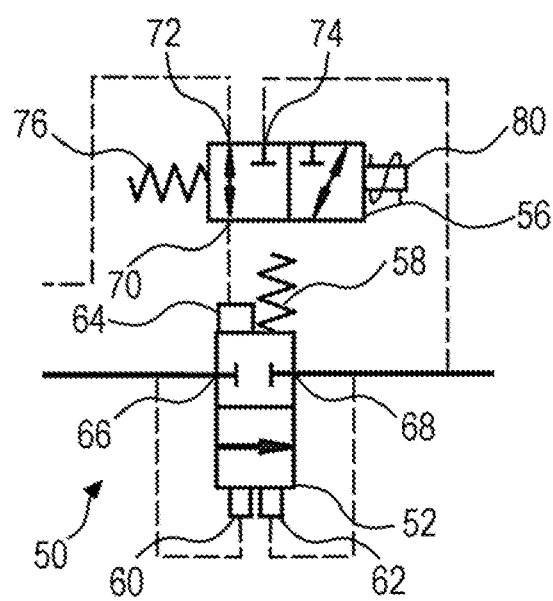
FIG. 3 shows a symbolic diagram of a second example of a pilot-pressure-controlled flow valve suited for use in the system of FIG. 1.

FIGS. 2 and 3 show symbolic representations of two control valves 48 and 50 suited to serve as control valves 46 for placement in a fluid system, such as the one shown in FIG. 1. The control valves 48 and 50 of FIGS. 2 and 3 have in common that a 2/2 way hydraulically controlled flow valve 52 is controlled by a pilot pressure, which is supplied via a solenoid-controlled pilot valve 54 or 56 configured as a 3/2 valve.

The flow valves 52 of FIGS. 2 and 3 are spring-biased toward the closed position with a valve spring 58 so that, under atmospheric pressure, the flow valves 52 are closed. The flow valve 52 has three effective areas. A first effective area 60 acting in the direction of opening the flow valve 52 is in direct fluid communication with the inlet 66 of the flow valve 52, while a second effective area 62, likewise acting in the direction of opening the flow valve 52 is in direct fluid communication with the outlet 68 of the flow valve 52. A third effective area 64 is in fluid connection with a first port 70 of the pilot valve. The third effective area 64 acts in the closing direction of the flow valve 52 and is greater than each one of the first and second effective areas 60 and 62. Accordingly, the third effective area 64 and the valve spring 58 act in the valve-closing direction, while the first and second effective areas 60 and 62, each being smaller than the third effective area 64, act in the valve opening direction.

As mentioned above, in FIGS. 2 and 3, a first port 70 of each of the pilot valves 54 and 56 is in fluid communication with the third effective area 64 of the flow valve 52. The second port 72 is connectable to a pressure source, and the third port 74 is in fluid communication with the outlet 68 of the flow valve 52.

The pilot valve of FIG. 2 is spring-biased via a pilot spring 76 toward establishing a connection between the first port 70 and the third port 74. The third port 74 supplies the outlet pressure of the flow valve 52. A solenoid 78 is positioned to acting against and to overcome the spring force when energized. The solenoid 78 actuates the pilot valve to establish a connection between the first port 70 and the second port 72.

In a fluid system 10 as shown in FIG. 1, the inlet 66 of the flow valve 52 is in fluid communication with the pressure side of the pump 28 or 32 and under significantly higher pressure than the outlet 68 whenever the pump 28 or 32 of the respective hot coolant loop or cold coolant loop is running while the solenoid 78 of the pilot valve is in its normal, de-energized position as shown. Thus the de-energized solenoid 78 results in the flow valve 52 being open while the pump 28 or 32 is running. The second port 72 of the pilot valve, which is in fluid communication with the first port 70 when the solenoid 78 is energized, may be connected to the inlet 66 of the flow valve 52 or to another coolant pressure source supplying a pressure that is higher than the outlet pressure of the flow valve 52. Energizing the solenoid 78 thus results in a higher pressure acting in the closing direction of the flow valve 52. Thus, the actuation of the pilot valve closes the flow valve 52.

The pilot valve 56 of FIG. 3 has a first port 70, a second port 72, and a third port 74 providing the same fluid communications as in the pilot valve of FIG. 2. In FIG. 3, however, the directions, in which the pilot spring 76 and the solenoid 80 act, are reversed. The pilot valve of FIG. 3 is spring-biased toward establishing a connection between the first port 70 and the second port 72. The solenoid 80 actuates the pilot valve to establish the connection between the first port 70 and the third port 74. Thus the de-energized solenoid 80 results in the flow valve 52 being closed while the pump 28 or 32 is running, and the actuation of the pilot valve 56 closes the flow valve 52.

Figure 4:
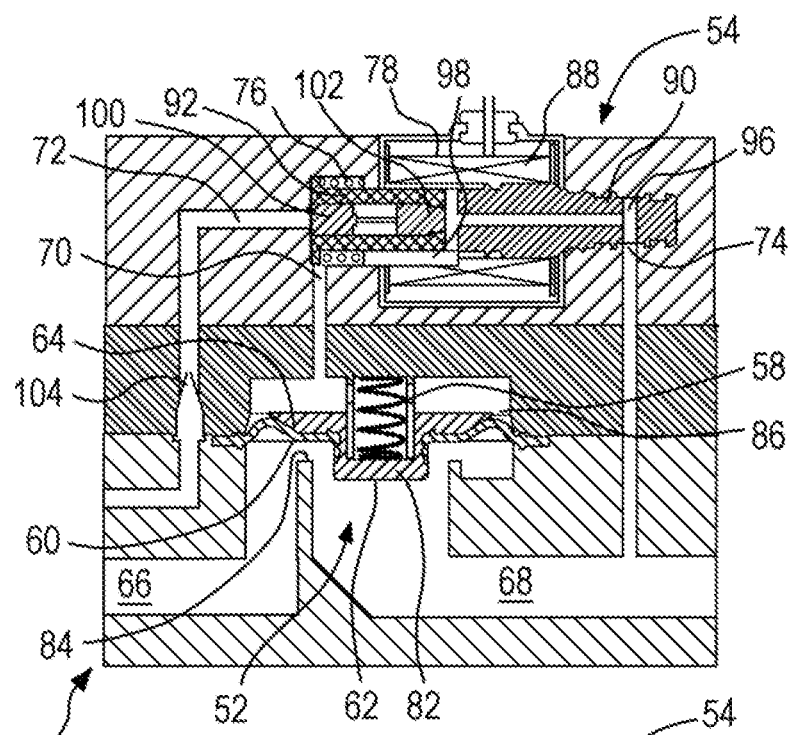
FIG. 4 shows a schematic cross-sectional layout of a pilot-pressure-controlled flow valve symbolically represented by the diagram of FIG. 2 with a de-energized solenoid.
Figure 5:
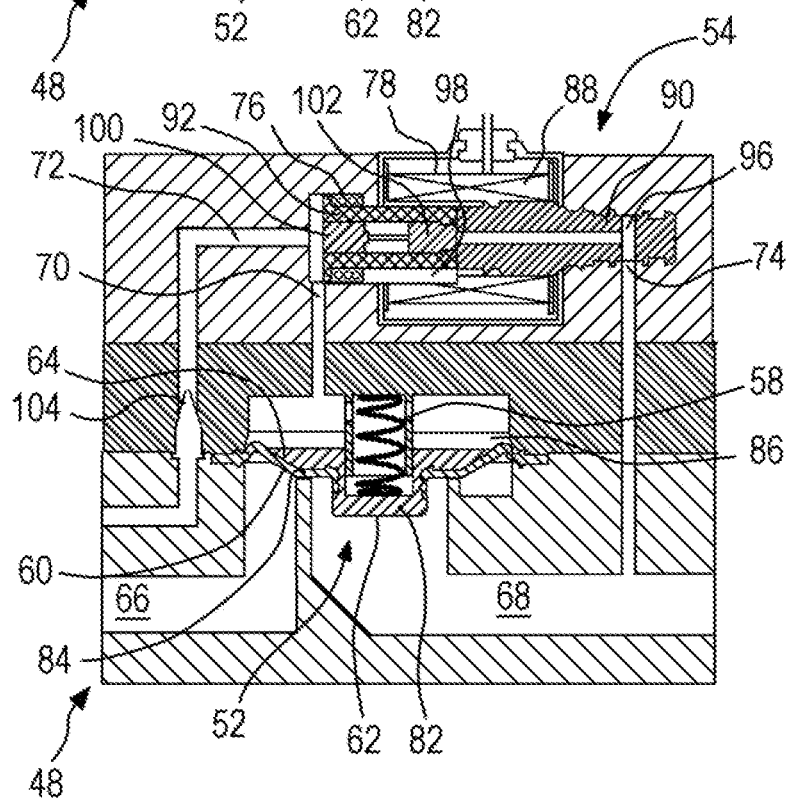
FIG. 5 shows the pilot-pressure-controlled flow valve of FIG. 4 with an energized solenoid.

FIGS. 4 and 5 show a schematic cross-section of a control valve 48 operating according to the principle illustrated in FIG. 2 while pressurized fluid is supplied to the inlet 66 of the flow valve 52. FIG. 4 shows the flow valve 52 in the open state while the solenoid 78 of the pilot valve 54 is de-energized, and FIG. 5 shows the flow valve 52 in the closed state while the solenoid 78 of the pilot valve 54 is energized.

In the example of FIGS. 4 and 5, the flow valve 52 includes a diaphragm 82 forming a valve member that cooperates with an annular valve seat 84. The valve seat 84 divides the area under the diaphragm 82 into a central area 62 exposed to the outlet pressure (second effective area 62) and a surrounding ring area 60 exposed to the inlet pressure (first effective area 60). The diaphragm 82 separates the central area 62 and the ring area 60 from a control chamber 86. The valve spring 58 is disposed in the control chamber 86 and biases the diaphragm 82 toward the valve seat 84. The pilot pressure 86 acts on the total area of the diaphragm 82 (third effective area 64) toward the closed state of the flow valve 52 shown in FIG. 5.

The pilot valve 54 of FIGS. 4 and 5 includes a solenoid 78 with an electromagnetic coil 88, a stationary anchor 90, and a movable armature 92 biased by a pilot spring 76 toward a first position, which is the normal position while no current flows through the electromagnetic coil 88. The anchor 90 features internal bores 96 to establish a fluid communication from the third port 74 to a valve chamber 98, in which the armature 92 is disposed. The armature 92 has two embedded sealing elements 100 and 102, of which a first sealing element 100 is configured to close the fluid communication between the second port 72 and the valve chamber 98, and a second sealing element 102 is configured to close the bore in the anchor 90 to close the fluid communication between the third port 74 and the valve chamber 98. The first port 70 leading to the control chamber 86 is in permanent fluid communication with the control chamber 86. A check valve 104, for example a duck-bill check valve 104 is disposed in the duct leading to the second port 72 to ensure that pressurized fluid entering the valve chamber 98 and thus to the control chamber 86 does not escape while the second port 72 communicates with the valve chamber 98. This serves the objective to utilize the highest system pressure to close the flow valve 52.

In the normal first position shown in FIG. 4, the pilot valve 54 communicates the pressure of the third port 74, i.e. of the outlet 68 of the flow valve 52, to the control chamber 86. As the inlet pressure of the flow valve 52 is significantly higher than the outlet pressure, the inlet pressure acting on the diaphragm 82 in the opening direction of the flow valve 52 overcomes the spring force and the pilot pressure 86 to displace the diaphragm 82 into the open position of the flow valve 52 shown in FIG. 4.

Energizing the solenoid to actuate the pilot valve 54 moves the armature 92 against the pilot spring 76 into the second position to disconnect the third port 74 from the valve chamber 98 and instead opens the second port 72 as shown in FIG. 5. As mentioned above, the second port 72 is connected to a high-pressure source, such as a pump outlet. For example, the second port 72 may open into the inlet 66 of the flow valve 52 that receives pressurized fluid from the pump 28 or 32. Because now the high pressure, trapped by the check valve 104, acts on the entire area of the diaphragm 82 in the closing direction of the flow valve 52 in addition to the spring force, the force in the closing direction exceeds the force in the opening direction, where the pressure acting on the diaphragm 82 cannot exceed the closing force. Once the flow valve 52 is closed, the high pressure from the inlet 66 only acts on the ring area in the opening direction, and the force in the opening direction is significantly smaller than in the closing direction. The flow valve 52 is securely closed until the armature 92 of the pilot valve 54 is shifted back to the first position. Only once the armature 92 is move back into the first position, the pressurized fluid in the control chamber 86 can escape through the third port 74.

Figure 6:
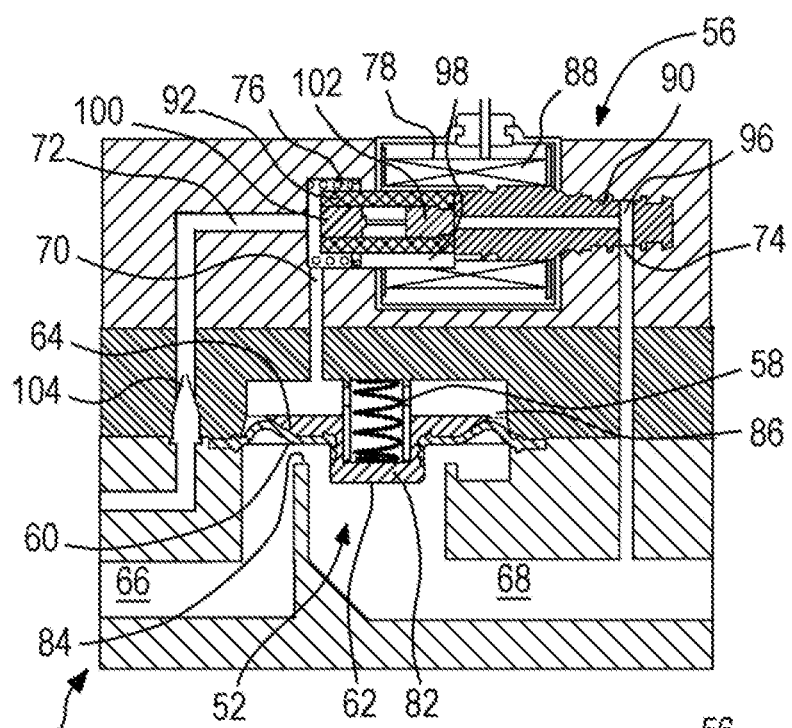
FIG. 6 shows a schematic cross-sectional layout of a pilot-pressure-controlled flow valve symbolically represented by the diagram of FIG. 3 with a de-energized solenoid.
Figure 7:
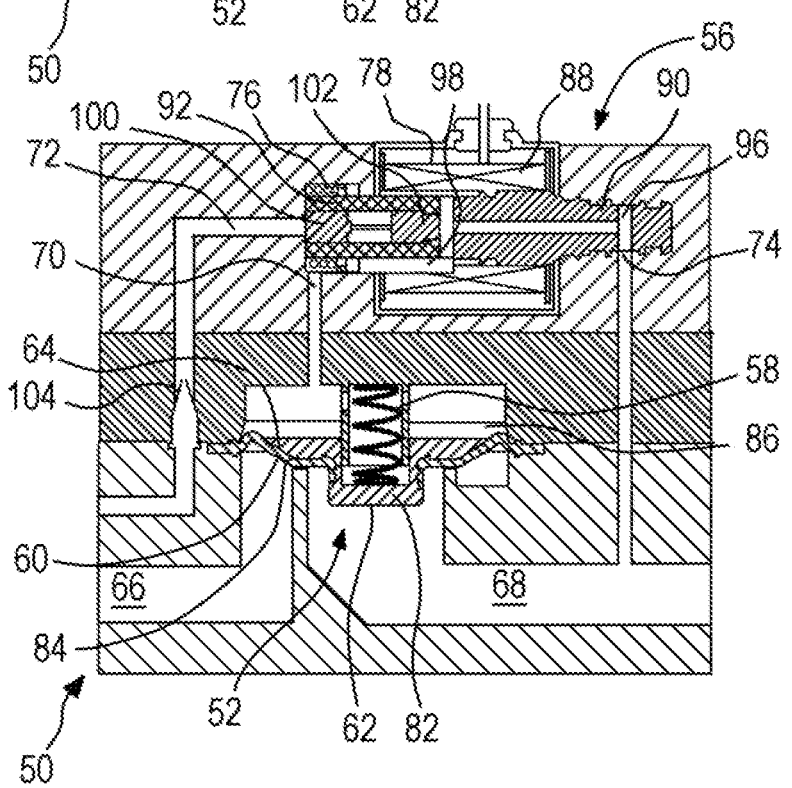
FIG. 7 shows the pilot-pressure-controlled flow valve of FIG. 6 with an energized solenoid.

The control valve 50 of FIGS. 6 and 7 represents the functional elements illustrated in FIG. 3. The parts of the control valve 50 of FIGS. 6 and 7 correspond to those of FIGS. 4 and 5, except that the pilot spring 76 acts opposite to the pilot spring 76 of FIGS. 4 and 5, and that the solenoid displaces the armature 94 in the opposite direction of FIGS. 4 and 5. Accordingly, when the inlet 66 of the flow valve 52 of FIGS. 6 and 7 is supplied with pressurized fluid, the de-energized state of FIG. 6 corresponds in function to the energized state shown in FIG. 5, and the energized state of FIG. 7 corresponds in function to the de-energized state shown in FIG. 4.

In a circuit as shown in FIG. 1, the second port 72 may be place in fluid communication with the inlet of the flow valve 52. Where the inlet pressure may not be sufficiently high for keeping the flow valve 52 closed, the second port 72 may be in fluid communication with a location immediately at the pump pressure side of the respective pump 28 or 32 that feeds the respective loop 16 or 14, in which the control valve 46 is disposed. Such a location is closer to the pump 28 or 32, respectively, than the inlet 66 of the flow valve 52, and thus lesser affected by a pressure drop than the inlet 66 of the flow valve. In a further modification, the second port 72 may be in fluid communication with a remote location at the pressure side of the coolant pump 32 or 28 of the respective other loop or of yet another, different coolant pump, where such a pump is closer to the second port 72 than the pump feeding the loop, in which the pilot valve 46 is disposed. In addition to providing the described valve structure of the control valves 46, for example as embodied in the control valves 48 and 50, which are composed of flow valves 52 and pilot valves 54 and 56, further improvements can be achieved by additional measures. For example, the pumps 28 and 32 of the coolant system may be run to generate a high pressure prior to shifting to a low pressure (or reverse) condition. This ensures that the maximum pump pressure is produced and contained in the pilot valve chamber 98 and in the control chamber 86 prior to lowering the pump pressure. Further, methods of utilizing one pilot solenoid to control multiple valves on the assembly reduces complexity. Accordingly, a single pilot valve 54 or 56 of FIGS. 4 through 7 may have multiple first ports 70, thus feeding several control chambers 86, respectively associated with different flow valves 52.

While the above description constitutes the preferred embodiments of the present invention, it will be appreciated that the invention is susceptible to modification, variation and change without departing from the proper scope and fair meaning of the accompanying claims.

What is claimed is:

1. A fluid system comprising:
a refrigerant loop including a condenser, a refrigerant expansion device, an evaporator, and a refrigerant compressor, the refrigerant loop conveying a phase-changing refrigerant;
at least one thermal fluid circuit for conveying coolant, the thermal fluid circuit forming a closed-loop fluid path and being in thermal communication with the refrigerant loop, either via the condenser for operating as a dedicated heating loop or via the evaporator for operating as a dedicated cooling loop;
the at least one thermal fluid circuit including:
a pump for circulating the coolant through the closed-loop fluid path, the pump having a pressure side;
a consumer device forming a heat sink or a heat source disposed in the closed loop fluid path such that the fluid circulated by the pump may travel through the consumer device; and
a first control valve and a second control valve, each of the first and second control valves including:
a hydraulically actuated flow valve disposed in the thermal fluid circuit between the pressure side of the pump and the consumer device, the flow valve having:
an inlet in fluid communication with the pressure side of the pump,
an outlet in fluid communication with an inlet of the consumer device, and
a control chamber for receiving a pilot pressure, the flow valve being operable to permit the coolant circulated by the pump to reach the consumer device or to block the coolant circulated by the pump from reaching the consumer device; and
a pilot valve configured to be actuated by a solenoid for providing the pilot pressure to the control chamber,
wherein the pilot pressure acts on the flow valve in a closing direction of the flow valve;
wherein the pilot valve has a first setting, in which pressurized coolant flows into the control chamber to move the flow valve to and keep the flow valve in a closed position, in which a fluid path from the inlet to the outlet of the flow valve is shut off as long as the pilot valve is in the first setting,
wherein the pilot valve has a second setting, in which the pilot pressure is lower than the pressure of the pressurized coolant while the pump is operating, and
wherein the first control valve is arranged upstream of the consumer with respect to the circulated coolant and the second control valve is arranged to bypass the consumer.

2. The fluid system of claim 1, wherein the pilot valve is a 3/2 way valve with a first port in permanent fluid communication with the control chamber, a second port in fluid communication with a pressure source, and a third port in fluid communication with a low-pressure conduit.

3. The fluid system of claim 2, wherein the third port is in fluid communication with the outlet of the flow valve.

4. The fluid system of claim 2, wherein the second port is in fluid communication with the inlet of the flow valve.

5. The fluid system of claim 2, wherein the pilot valve establishes a fluid communication between the first port and the second port in the first setting and a fluid communication between the first port and the third port in the second setting.

6. The fluid system of claim 2, wherein the control valve comprises a check valve disposed immediately upstream of the second port to allow pressurized coolant to flow toward the pilot valve and to prevent the coolant from exiting the pilot valve via the second port.

7. The fluid system of claim 2, wherein the pilot valve is in the first setting when the solenoid is de-energized and in the second setting when the solenoid is energized.

8. The fluid system of claim 2, wherein the pilot valve is in the first setting when the solenoid is energized and in the second setting when the solenoid is de-energized.

9. The fluid system of claim 1, wherein the flow valve further comprises
a valve member formed by a diaphragm separating the inlet and the outlet from the control chamber, and
a valve spring biasing the flow valve toward the closed position.

10. The fluid system of claim 1, wherein the consumer device is a heat source comprising a vehicle engine or a vehicle energy storage system.

11. A control valve for controlling a fluid flow through a fluid circuit, the control valve comprising:
a 2/2 way hydraulically actuated flow valve having
an inlet and an outlet;
a control chamber for receiving a pilot pressure; and
a valve member operable by the pilot pressure to selectively open and close a fluid path from the inlet to the outlet, the pilot pressure acts on the flow valve in a closing direction of the flow valve; and
a pilot valve configured to be actuated by a solenoid for providing the pilot pressure to the control chamber,
wherein the pilot valve is a 3/2 way valve with a first port in fluid communication with the control chamber, a second port to be connected to a pressure source with a check valve disposed immediately upstream of the second port to allow pressurized coolant to flow toward the pilot valve and to prevent the coolant from exiting the pilot valve via the second port, and a third port connected to the outlet of the flow valve, the pilot valve having a first position connecting the first port with the second port and a second position connecting the first port with the third port,
wherein the valve member is a diaphragm permanently separating the control chamber from both the inlet and the outlet,
wherein the pilot valve establishes a fluid communication between the first port and the second port in a first setting and a fluid communication between the first port and the third port in a second setting, wherein the pilot valve is in one of the first and second settings when the solenoid is energized and in the other one of the first and second settings when the solenoid is de-energized.

12. The control valve of claim 11, wherein the flow valve further comprises a valve seat on a side of the diaphragm opposite from the control chamber, the valve seat surrounding a central area in fluid connection with the outlet of the flow valve and surrounded by a ring area in fluid connection with the inlet of the flow valve.

13. The control valve of claim 12, wherein the flow valve further comprises a valve spring biasing the diaphragm toward the valve seat.

14. The control valve of claim 11, wherein the third port is in fluid communication with the outlet of the flow valve.

15. The control valve of claim 11, wherein the pilot valve is in the first setting when the solenoid is de-energized and in the second setting when the solenoid is energized.

16. The control valve of claim 11, wherein the pilot valve is in the first setting when the solenoid is energized and in the second setting when the solenoid is de-energized.

* * * * *